US009498911B2

(12) United States Patent
Babin et al.

(10) Patent No.: US 9,498,911 B2
(45) Date of Patent: Nov. 22, 2016

(54) COINJECTION HOT RUNNER INJECTION MOLDING SYSTEM

(75) Inventors: Denis Babin, Georgetown (CA); Scott Gammon, Guelph (CA)

(73) Assignee: Mold-Masters (2007) Limited, Georgetown, ON (CA)

( * ) Notice: Subject to any disclaimer, the term of this patent is extended or adjusted under 35 U.S.C. 154(b) by 576 days.

(21) Appl. No.: 13/880,407

(22) PCT Filed: Oct. 24, 2011

(86) PCT No.: PCT/CA2011/050667
§ 371 (c)(1),
(2), (4) Date: Apr. 19, 2013

(87) PCT Pub. No.: WO2012/051721
PCT Pub. Date: Apr. 26, 2012

(65) Prior Publication Data
US 2013/0207289 A1    Aug. 15, 2013

Related U.S. Application Data

(63) Continuation-in-part of application No. 13/238,074, filed on Sep. 21, 2011, now Pat. No. 8,469,687.

(60) Provisional application No. 61/405,949, filed on Oct. 22, 2010, provisional application No. 61/384,984, filed on Sep. 21, 2010, provisional application No. 61/391,412, filed on Oct. 8, 2010, provisional application No. 61/405,949, filed on Oct. 22, 2010.

(51) Int. Cl.
*B29C 45/16*    (2006.01)
*B29C 45/76*    (2006.01)

(52) U.S. Cl.
CPC ........... *B29C 45/76* (2013.01); *B29C 45/1603* (2013.01); *B29C 45/1684* (2013.01)

(58) Field of Classification Search
CPC .................. B29C 45/1603; B29C 2045/1614; B29C 45/76
See application file for complete search history.

(56) References Cited

U.S. PATENT DOCUMENTS 3,947,175 A    3/1976    Melcher
3,947,177 A    3/1976    Eckardt
(Continued)

FOREIGN PATENT DOCUMENTS

AT    391833 B    12/1990
EP    0262470    4/1988
(Continued)

OTHER PUBLICATIONS

"International Search Report and Written Opinion", Int'l Appl. No. PCT/CA2011/050580, mailed Dec. 13, 2011.

*Primary Examiner* — Galen Hauth
(74) *Attorney, Agent, or Firm* — Medler Ferro PLLC

(57)    ABSTRACT

A coinjection molding apparatus is disclosed that provides a skin material melt stream and a core material melt stream to a nozzle. The skin material melt stream forms an inner and outer layer of a molded article with the core material melt stream forming a core layer between the inner and outer skin material layers. A volume of the core material for forming the core layer may be manually adjusted between injection cycles to change a thickness of the core layer between a first molded article and a second molded article. Alternatively, a volume of the core material for forming the core layer may be automatically adjusted during an injection cycle to change a thickness of the core layer during formation of the molded article, such that the molded article will have a core layer with at least a first thickness and a second thickness.

18 Claims, 15 Drawing Sheets

(56) References Cited

U.S. PATENT DOCUMENTS

| | | |
|---|---|---|
| 4,035,466 A | 7/1977 | Langecker |
| 4,657,496 A | 4/1987 | Ozeki et al. |
| 5,030,077 A | 7/1991 | Orimoto et al. |
| 5,131,830 A | 7/1992 | Orimoto et al. |
| 5,141,696 A * | 8/1992 | Osuna-Diaz ............... 264/297.2 |
| 5,143,681 A | 9/1992 | Daubenbuchel et al. |
| 5,143,733 A | 9/1992 | Von Buren et al. |
| 5,156,857 A | 10/1992 | Wang et al. |
| 5,286,184 A | 2/1994 | Nakayama |
| 5,914,138 A | 6/1999 | Swenson |
| 5,935,615 A | 8/1999 | Gellert et al. |
| 5,935,616 A | 8/1999 | Gellert et al. |
| 5,942,257 A | 8/1999 | Gellert et al. |
| 6,030,198 A | 2/2000 | Babin |
| 6,099,780 A | 8/2000 | Gellert |
| 6,187,241 B1 | 2/2001 | Swenson |
| 6,245,278 B1 | 6/2001 | Lausenhammer et al. |
| 6,261,075 B1 | 7/2001 | Lee et al. |
| 6,273,706 B1 | 8/2001 | Gunther |
| 6,274,075 B1 | 8/2001 | Gellert |
| 6,332,767 B1 | 12/2001 | Kudert et al. |
| 6,350,401 B1 | 2/2002 | Gellert |
| 6,440,350 B1 | 8/2002 | Gellert et al. |
| 6,596,213 B2 * | 7/2003 | Swenson ....................... 264/255 |
| 6,648,622 B1 | 11/2003 | Gellert et al. |
| 6,649,101 B2 | 11/2003 | Kermet |
| 6,655,945 B1 | 12/2003 | Gellert et al. |
| 6,908,581 B2 | 6/2005 | Sabin et al. |
| 7,175,419 B2 | 2/2007 | Babin |
| 7,306,446 B2 | 12/2007 | Sabin et al. |
| 7,364,425 B2 | 4/2008 | Fairy |
| 7,399,442 B2 | 7/2008 | Sabin et al. |
| 7,510,387 B2 | 3/2009 | Sicilia |
| 7,517,480 B2 | 4/2009 | Sabin et al. |
| 7,527,490 B2 | 5/2009 | Fairy |
| 7,713,046 B2 | 5/2010 | Fairy |
| 7,731,489 B2 | 6/2010 | Fairy |
| 2004/0247739 A1 * | 12/2004 | Sabin et al. .................. 425/573 |
| 2005/0140061 A1 | 6/2005 | Puniello et al. |
| 2006/0097083 A1 | 5/2006 | Hofstetter et al. |
| 2009/0181120 A1 | 7/2009 | Fairy |
| 2010/0007048 A1 | 1/2010 | Schweininger et al. |
| 2011/0115122 A1 | 5/2011 | Abe et al. |
| 2011/0217496 A1 | 9/2011 | Swenson |

FOREIGN PATENT DOCUMENTS

| | | |
|---|---|---|
| GB | 1441347 | 6/1976 |
| JP | 61274912 | 12/1986 |
| JP | 02022022 A | 1/1990 |
| JP | 03024928 A | 2/1991 |
| JP | 4-84654 A | 3/1992 |
| JP | 2008265188 A | 11/2006 |
| JP | 2008/265188 | 11/2008 |
| WO | WO-2011/006999 | 1/2011 |

* cited by examiner

COINJECTION HOT RUNNER INJECTION MOLDING SYSTEM

CROSS-REFERENCE TO RELATED APPLICATIONS

This application claims the benefit of to U.S. Appl. No. 61/405,949, filed Oct. 22, 2010 and is a continuation-in-part of U.S. application Ser. No. 13/238,074, filed Sep. 21, 2011, which claims the benefit of U.S. Appl. No. 61/384,984 filed Sep. 21, 2010, U.S. Appl. No. 61/391,412 filed Oct. 8, 2010, and U.S. Appl. No. 61/405,949 filed Oct. 22, 2010, each of which is incorporated by reference herein in its entirety.

FIELD OF THE INVENTION

The present invention relates to injection molding and more particularly to a coinjection hot runner injection molding system that controls flow of multiple melt streams of moldable material through a mold gate and into a mold cavity.

BACKGROUND OF THE INVENTION

It is known in the art of injection molding to simultaneously or sequentially inject two melt streams of moldable material into a mold cavity using a single hot runner injection molding nozzle, which is commonly referred to as coinjection. A conventional manner of controlling the flow of two or more melt streams through the nozzle and into a mold gate and subsequently the cavity has been provided by rotating a valve pin member of the nozzle to align different melt channels or by axially reciprocating a valve pin member and one or more valve sleeve members, which surround the valve pin member, of the nozzle between open and closed positions. Although many systems have been developed utilizing a valve pin member and a valve sleeve member that are axially reciprocated to provide simultaneous or sequential injection of two or more melt streams, such arrangements are not without their deficiencies, such as inaccuracies in reciprocating movement and difficulties in keeping the melt streams adequately separated, as well as adding complexity to the manufacture, assembly, and operation of the hot half of the injection molding systems. Another deficiency in such systems is that it is difficult to align a valve sleeve member and/or a valve pin member with the mold gate, such aligning being important for improving injection technique and reducing gate wear. In a multi cavity hot runner injection molding system creating consistent parts from cavity to cavity has long been a challenge.

In some conventional coinjection systems, such as those described in U.S. Pat. No. 3,947,177, U.S. Pat. No. 6,596, 213, and U.S. Pat. No. 7,517,480, a volume of a core layer melt stream to a volume of inner and outer layer melt streams may be controlled at the injection units by setting a shot size and injection velocity of each melt stream provided thereby. In other conventional coinjection systems, such as U.S. Pat. No. 5,914,138, viscosity of the various melt streams is controlled to affect a volume of the core layer melt stream relative to the volumes of the inner and outer layer melt streams entering a given mold cavity.

A volume of a core material for producing a core layer of a molded article is particularly relevant in 'barrier' coinjection molding applications, wherein the core layer of a barrier material is a tiny fraction of the total combined melt streams entering a given mold cavity, and in 'filler' coinjection molding applications, wherein the core layer of a filler material is a large portion of the total combined melt streams entering a given mold cavity. In both 'barrier' and 'filler' coinjection molding applications providing precise equal amounts of the core material to each individual mold cavity is critical in order to ensure consistent molded parts across the mold. Often such control of a ratio of the core layer material to the inner and outer layer material occurs at the utmost upstream end of the hot runner system, i.e., at the machine barrel that supplies each material, which cannot take into account shear history differences/imbalances that may occur by the time a particular melt stream reaches a mold cavity at the downstream end of the hot runner system. During a given injection cycle, shear history imbalances may result in some mold cavities receiving too much core material and some mold cavities receiving too little core material. Since the precise amount of core layer material is critical to ensuring quality coinjected molded articles, even a slight imbalance between mold cavities can have a large impact.

The aforementioned problems may be exacerbated in cases where a molded article requires different core layer thicknesses within a single molded article, such as in a molded closure having a thinner core layer in a threaded region and a thicker core layer in an end region. More particularly, if a throttling or other adjustment of the core layer material is done at the upstream end of the molding system, for instance in the machine, it is often more difficult to control the exact location in a molded article where a core layer thickness will transition in each mold cavity.

Embodiments hereof address at least some of the problems identified in the coinjection applications described above by providing a mechanism that throttles or adjusts a core layer material flow proximate a downstream end of the hot runner system, and more specifically throttles or adjusts the core layer material flow within a nozzle tip thereof, to allow for more precise control of a volume of core layer material to a volume of material used to form inner and outer layers of a molded article within each individual cavity. Such control proximate a mold gate of a mold cavity may result in a greater overall consistency between all of the cavities of the coinjection molding system.

SUMMARY OF THE INVENTION

Embodiments hereof are directed to coinjection molding apparatus that provide a skin material melt stream and a core material melt stream to a hot runner injection molding nozzle. The nozzle includes a nozzle tip that defines a central skin material melt passage for receiving the skin material melt stream, an annular core material melt passage for receiving the core material melt stream and an annular outer layer melt passage, wherein a portion of the skin material melt stream from the central skin material melt passage is directed to the outer layer melt passage via one or more tunnel channels that cross the core material melt stream. The skin material melt stream from the central skin material melt passage is directed to a mold cavity for forming an inner layer of a molded article, the core material melt stream from the core material melt passage is directed to the mold cavity for forming a core or barrier layer of the molded article, and the skin material melt stream from the outer layer melt passage is directed to the mold cavity for forming an outer layer of the molded article.

In an embodiment, a volume of the core material for forming the core layer of the molded article may be manually adjusted between injection cycles to change a thickness of the core layer between a first molded article and a second molded article. In another embodiment, a volume of the core material for forming the core layer of the molded article may be automatically adjusted during an injection cycle to change a thickness of the core layer during formation of the molded article, such that the molded article will have a core layer with at least a first section of a first thickness and a second section of a second thickness.

BRIEF DESCRIPTION OF THE FIGURES

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF THE INVENTION

Specific embodiments of the present invention are now described with reference to the figures, wherein like reference numbers indicate identical or functionally similar elements. In the following description, "downstream" is used with reference to the direction of mold material flow from an injection unit of an injection molding machine to a mold cavity of a mold of an injection molding system, and also with reference to the order of components or features thereof through which the mold material flows from the injection unit to the mold cavity, whereas "upstream" is used with reference to the opposite direction. The following detailed description is merely exemplary in nature and is not intended to limit the invention or the application and uses of the invention. Although the description of embodiments hereof is in the context of a hot runner injection molding system, the invention may also be adapted for use in other molding applications where it is deemed useful, nonlimiting examples of which include molding of thermoset resins such as liquid silicone rubber or the like. Furthermore, there is no intention to be bound by any expressed or implied theory presented in the preceding technical field, background, brief summary or the following detailed description.

Figure 1:
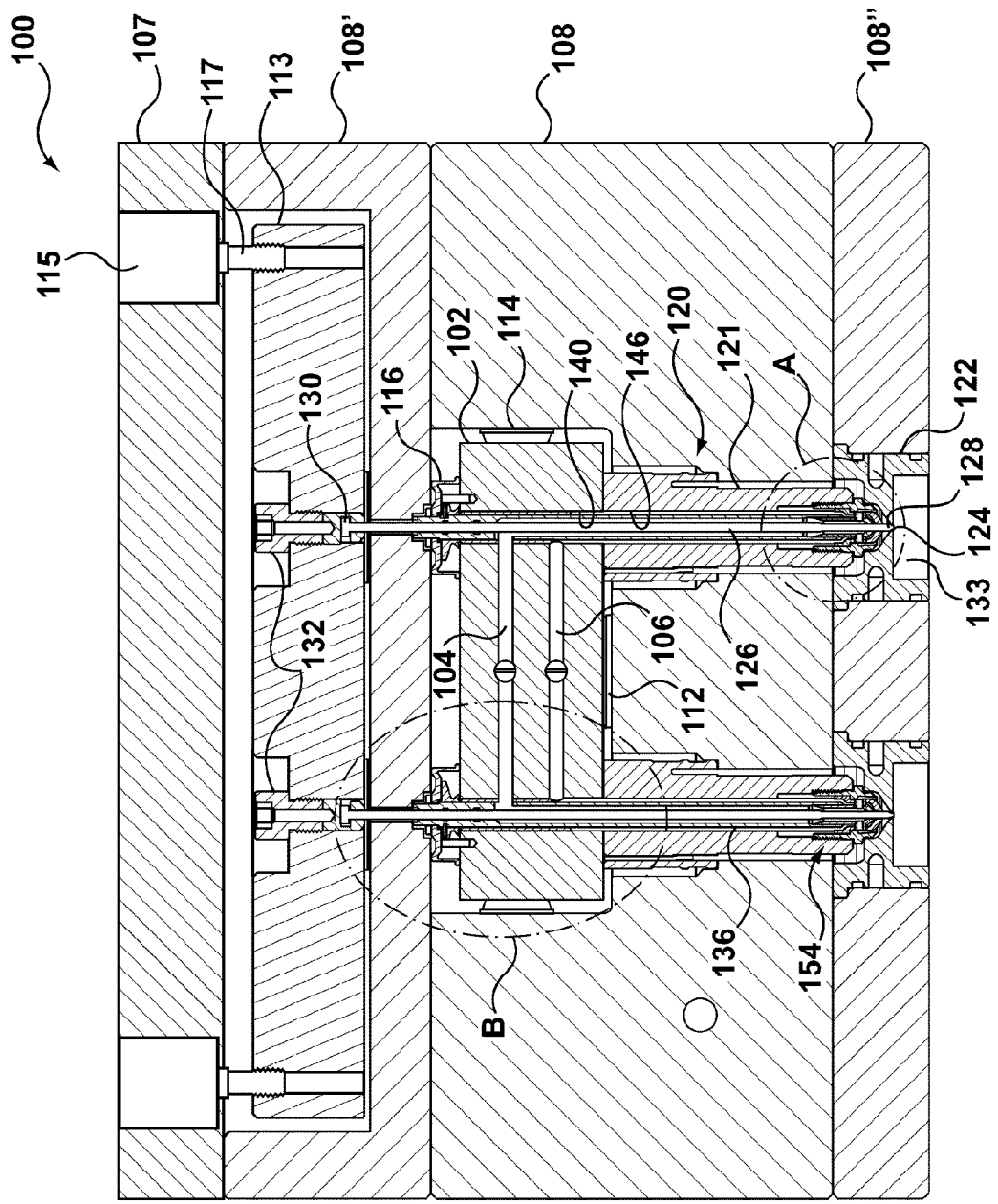
FIG. 1 is a sectional view of a coinjection hot runner injection molding system in accordance with an embodiment hereof.
Figure 2:
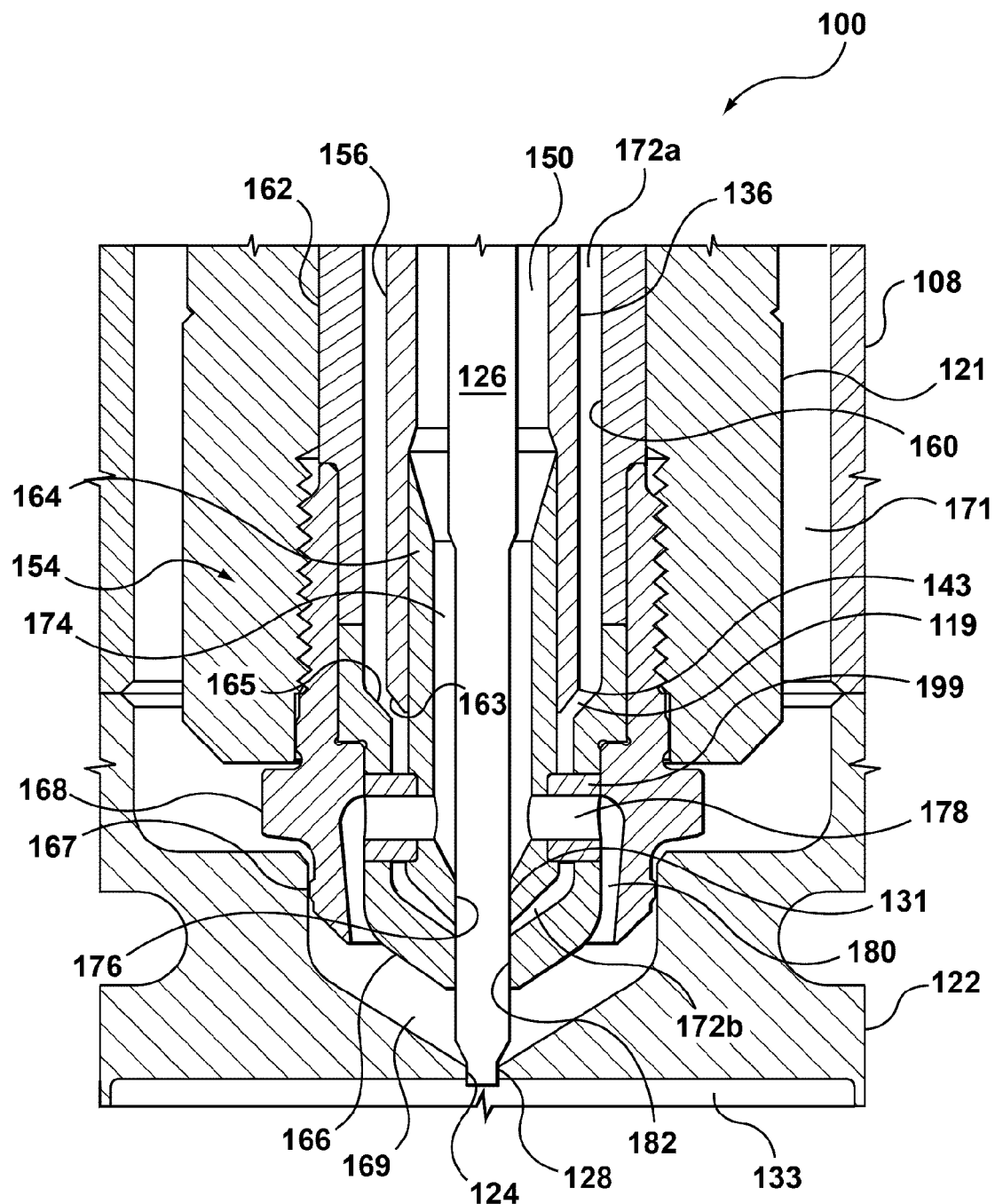
FIG. 2 is an enlarged view of Area A of FIG. 1 showing a valve pin in a gate closed position.
Figure 3:
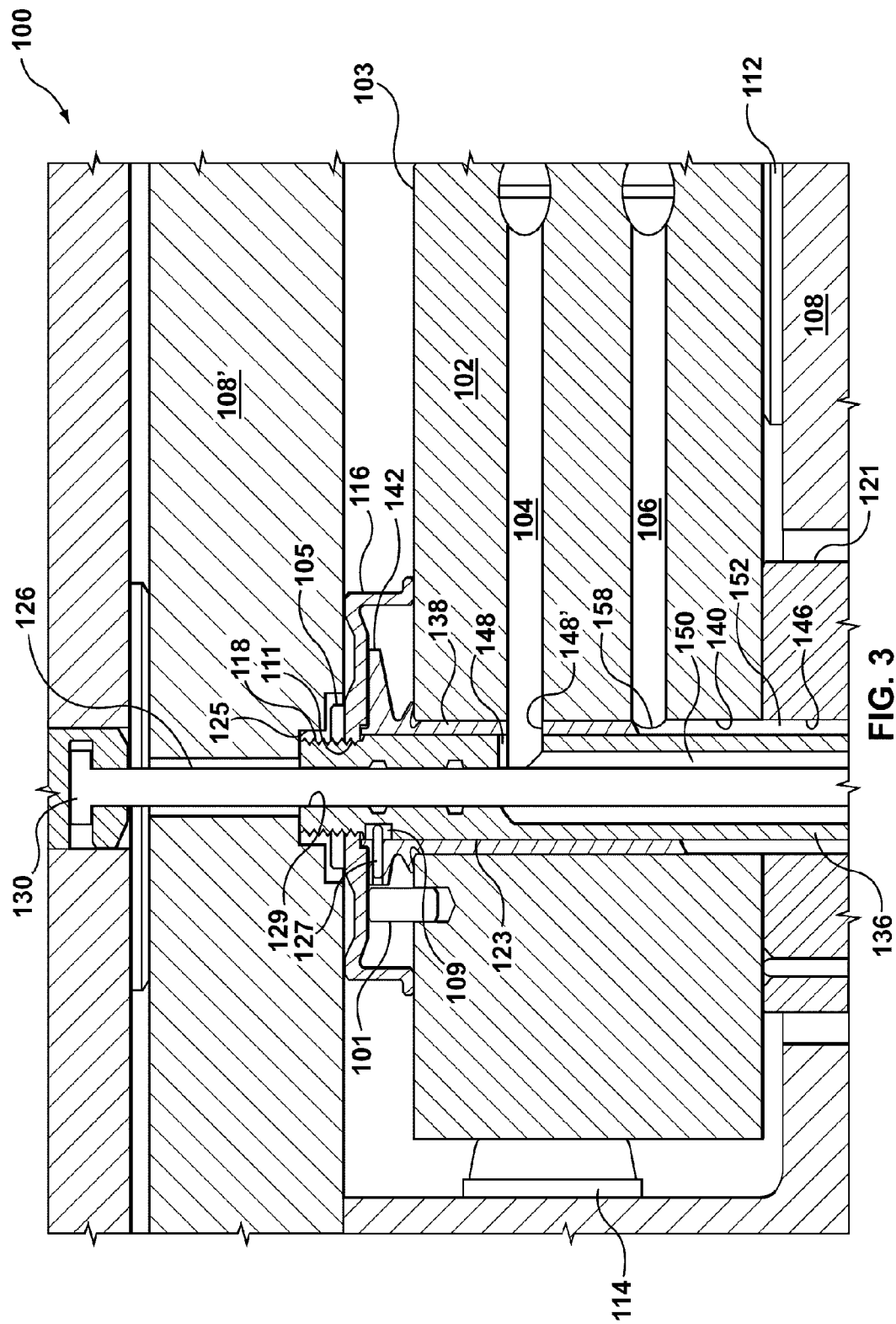
FIG. 3 is an enlarged view of Area B of FIG. 1.
Figure 4A:
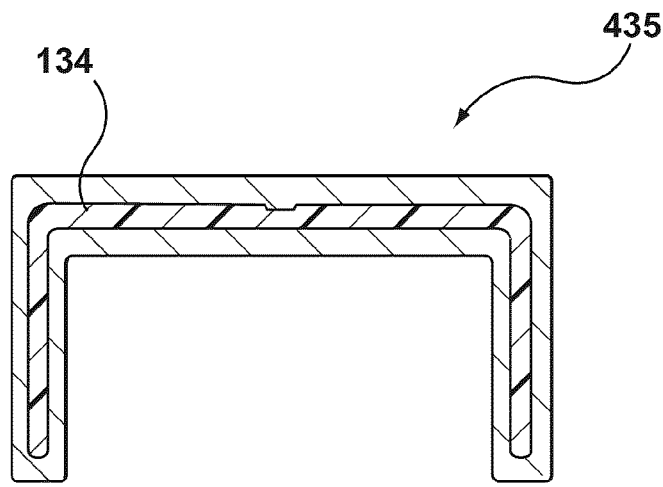
FIGS. 4A and 4B are sectional views of exemplary molded caps that may be molded by the coinjection apparatus of FIG. 1.
Figure 4B:
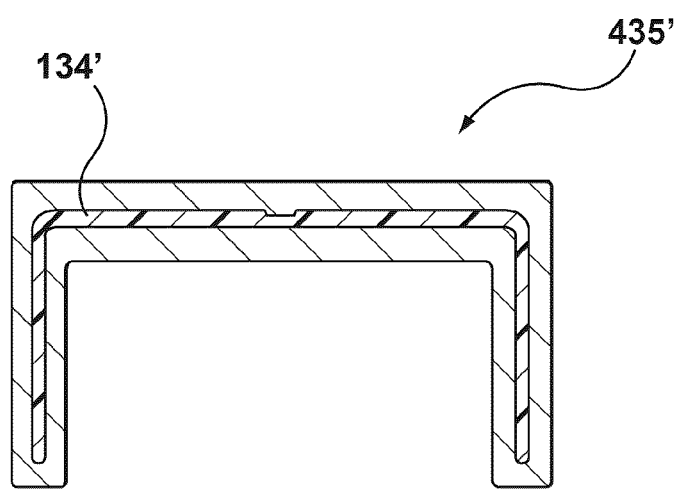

FIG. 1 depicts a sectional view of a hot runner coinjection apparatus 100 in accordance with an embodiment hereof shown in partial section, with FIG. 2 being an enlarged view of Area A of FIG. 1 and FIG. 3 being an enlarged view of Area B of FIG. 1. It would be understood by one of ordinary skill in the art that coinjection apparatus 100 constitutes a hot half of a molding system that is designed to mate with a cold half or core side of the molding system in an injection molding machine (not shown). In FIG. 1, coinjection apparatus 100 includes a mold cavity 133 for producing a three-layer mold cap, such as mold caps 435, 435' shown in section in FIGS. 4A and 4B respectively.

Coinjection apparatus 100 includes a manifold 102 having a first set of runners or melt channels 104 for receiving a melt stream of a moldable skin material from a first melt source (not shown) and also having a second set of runners or melt channels 106 for receiving a second melt stream of a moldable core material from a second melt source (not shown). The first and second set of manifold runners 104, 106 are independent and do not communicate with each other, such that the skin material and core material melt streams do not combine in manifold 102. The lengths, diameters or widths, and general geometry of the first and second set of manifold runners 104, 106 depend on the specific application and the amounts and natures of the moldable skin and core materials. Manifold 102 is provided with a heater (not shown) to maintain the temperature of the first and second melt streams of the respective moldable skin and core materials. In an embodiment, the skin material of the skin melt stream is a main, or surface material for molding an inner and outer layer of a molded article, such as a cap for a plastic bottle, with the core material of the core melt stream being a barrier material for molding a middle, barrier or filler layer disposed between the inner and outer layers of the molded article.

Manifold 102 is located within cooled mold plate 108 surrounded by an insulative air gap, with the air gap being maintained during an injection molding operation by a locating ring 112, various pressure disks 114, and valve disks 116. Coinjection apparatus 100 includes a back plate 107, various other cooled mold plates 108', 108" and a yoke plate 113. Yoke plate 113 is surrounded by mold plate 108' and back plate 107.

Coinjection apparatus 100 further includes hot runner valve-gated nozzles 120, each corresponding to a mold gate 124 defined by a respective mold gate insert 122, which is disposed within mold plate 108". Although a gate area and mold gate 124 of coinjection apparatus 100 is formed by mold gate insert 122, this is by way of illustration rather than limitation as one of skill in the art would recognize that the gate area may defined instead by one or more other injection molding structure(s), such as a mold gate and gate area defined in a mold cavity plate, without departing from the scope of the present invention.

As is conventional, each valve-gated nozzle 120 includes, inter alia, a nozzle body 121, a nozzle tip 154, a nozzle heater (not shown), a thermocouple (not shown) and other components as would be known to one of ordinary skill in the art. Nozzle body 121 is generally cylindrical and includes a longitudinal bore 146, which is also generally cylindrical. The longitudinal bore 146 of each nozzle 120 is aligned with a longitudinal bore 140 of manifold 102. An actuatable valve pin 126 slidably extends through bores 140, 146 of manifold 102 and nozzle 120, respectively, with a tip portion 128 of valve pin 126 being shown seated within mold gate 124 in FIGS. 1 and 2. A head portion 130 of each valve pin 126 is coupled to a respective valve pin coupler 132 held within yoke plate 113 in a manner as would be known to one of ordinary skill in the art.

Disposed in back plate 107 are yoke plate actuators 115 for actuating yoke or valve pin plate 113, to which valve pin head portions 130 are coupled. Actuators 115 can translate yoke plate 113 between open, closed and various intermediate positions by linear motion, e.g., a pneumatic or hydraulic piston, or rotary motion, e.g., an electric screw drive. To accomplish such movement, each actuator 115 has a stationary part, e.g., a housing or cylinder, connected to bake plate 107 and also has a movable part 117, e.g., a piston or part extending from the piston, connected to yoke plate 113. The number of actuators is a design choice, and in other embodiments more or fewer actuators can be used. Any style of actuator is suitable, provided that it can translate the yoke plate 115 and valve pins 126 between closed and open positions. In FIG. 1, yoke plate 113 is positioned such that valve pins 126 are in the closed position seated within mold gates 124. If actuators 115 depend on a working fluid for operation, i.e., pneumatic or hydraulic types, fluid conduits (not shown) can be provided in back plate 107. In other embodiments where actuators 115 are electric or magnetic or of some other design, electrical conduits (not shown) can be provided in back plate 107. In such an embodiment, yoke plate 113 and subsequently valve pins 126 coupled thereto may be actuated between open, closed and various intermediate positions therebetween by an electronic servomotor drive, such as synchro-plate valve pin actuation provided by an E-Drive™ System available from Mold-Masters Limited of Georgetown, Ontario Canada, that allows a stroke distance of valve pin 126 to be adjusted by an operator. In another embodiment, a solenoid actuator that provides incremental movement of the valve pin may be used. In various other embodiments, any valve pin actuation system that allows the valve pin to be moved incrementally may be used.

Although coinjection apparatus 100 is shown having two valve-gated nozzles 120 and related components, this set-up merely serves as an example, as more or fewer valve-gated nozzles and related components may readily be used without altering the principles of the invention. Further, valve pin actuation by way of an actuated yoke plate is also shown by example and not limitation. In another embodiment, each valve pin may be coupled to an individual actuator such as a piston housed within a cylinder.

Manifold 102 and each nozzle 120 are adapted to receive a repositionable sleeve 136 through respective bores 140, 146 such that valve pin 126 slidably extends within sleeve 136. With references to FIGS. 1-3, repositionable sleeve 136 is an elongate hollow tubular structure having an upstream end 123 that defines a valve pin guiding bore 129 that is sized to be substantially equal to an outer diameter of valve pin 126 while still allowing for sliding movement of valve pin 126 therein and a downstream end 143 that sits within nozzle tip 154. Upstream end 123 of sleeve 136 is disposed within an outer fixed sleeve 138 to be longitudinally repositionable relative thereto as described below. Fixed sleeve 138 includes a radially extending head segment 142 that sits or is sandwiched between pressure disk 116 and an upstream surface 103 of manifold 102. Rotation of fixed sleeve 138 relative to manifold 102 is prevented by engagement of an anti-rotation pin or dowel 101 between head segment 142 and manifold 102. In turn rotation of repositionable sleeve 136 relative to fixed sleeve 138 is prevented by engagement of an anti-rotation pin or dowel 127 between a longitudinally extended slot 109 in upstream end 123 of sleeve 136 and a corresponding bore within head segment 142 of fixed sleeve 138.

Figure 2A:
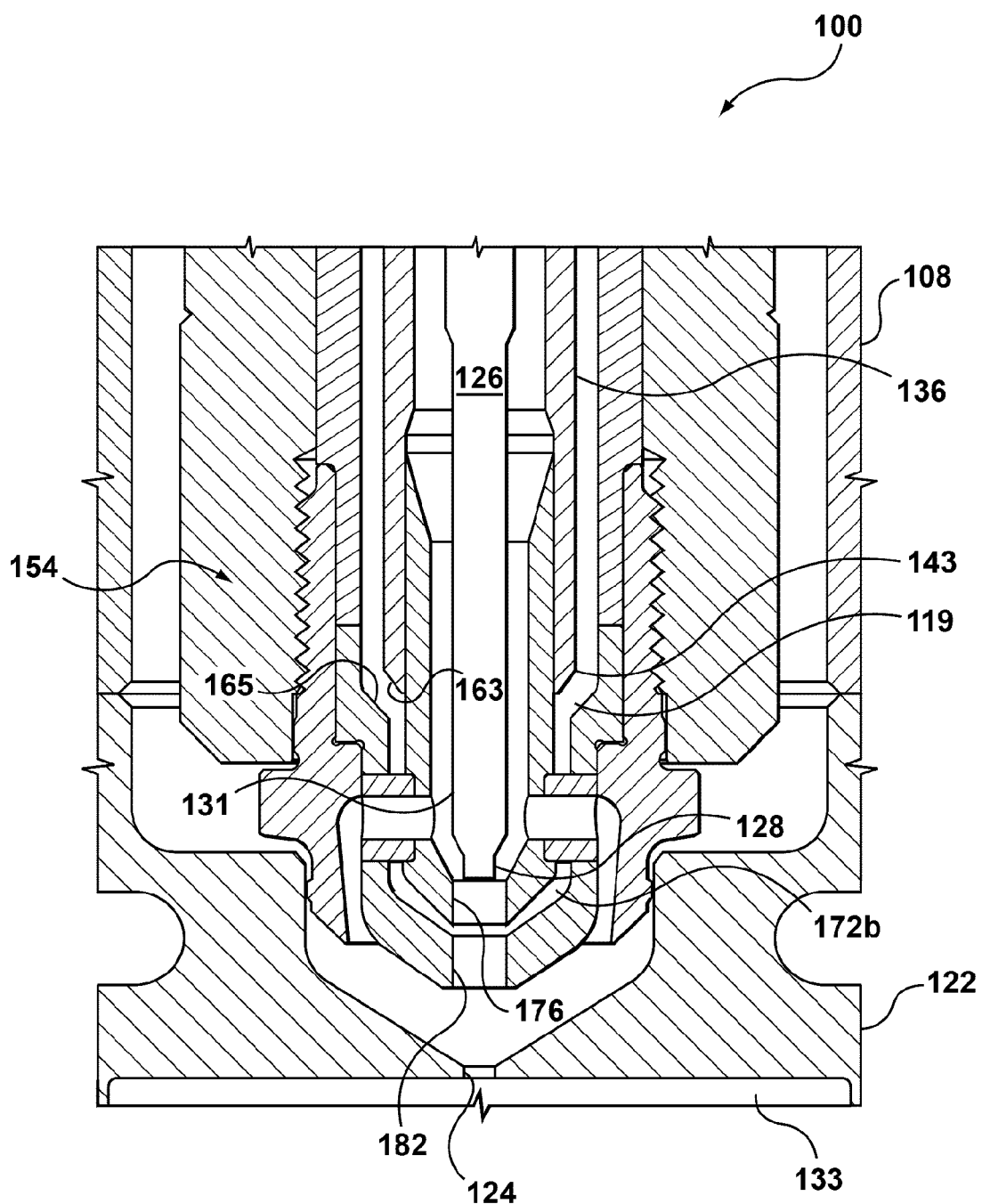
FIGS. 2A and 2B are alternate configurations of the portion of the coinjection apparatus shown in FIG. 2 showing the valve pin in an open or retracted position.
Figure 2B:
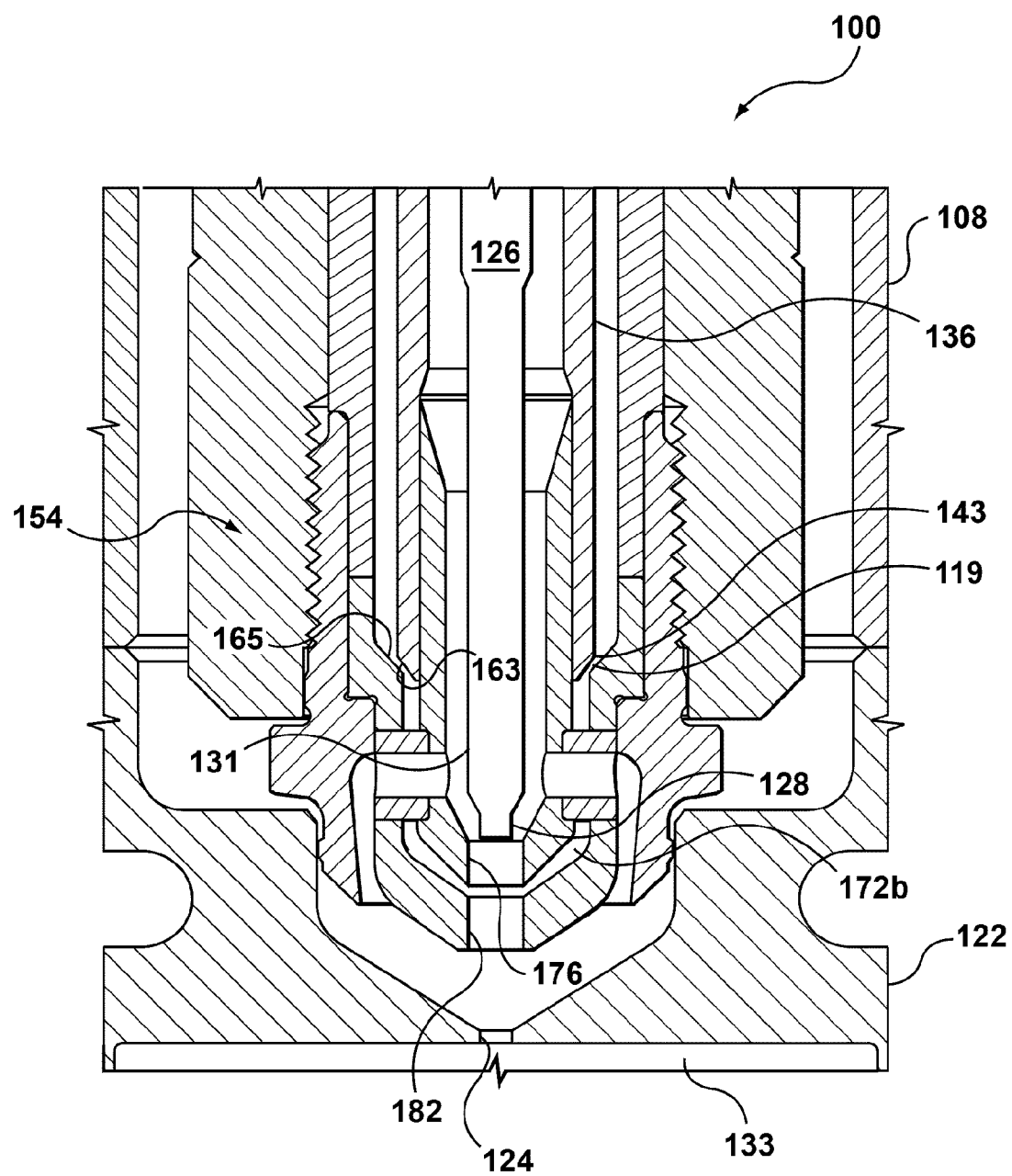

Upstream end 123 of repositionable sleeve 136 includes a threaded head portion 118 that engages with a corresponding threaded bore 111 of valve disk 116 and a locknut 105. Threaded head portion 118 and locknut 105 sit within a corresponding bore 125 in mold plate 108'. Lock nut 105 may be loosened to permit valve disk 116 to be rotated relative to repositionable sleeve 136 in order to change a longitudinal position of sleeve 136 and thereafter lock nut 105 is retightened to secure the change in position. The change in longitudinal position of sleeve 136 in turn raises or lowers downstream end 143 of sleeve 136 within nozzle tip 154, as shown in FIGS. 2A and 2B, respectively, to increase or decrease a size or width of annular opening 119 and thereby permit a greater or lesser volume of core material to flow toward mold gate 124, as will be explained in more detail below.

The hollow tubular structure of sleeve 136 defines a central skin material melt channel 150 and forms an annular core material melt channel 152 between an outer surface thereof and bores 140, 146 of manifold 102 and nozzle 120, respectively, and defining an upstream portion of an annular core material melt passage 172a between the sleeve outer surface and a corresponding surface of nozzle tip 154. Accordingly, sleeve 136 effectively divides manifold bore 140 and nozzle bore 146 into two concentric melt channels, with skin material melt channel 150 being surrounded by annular core material melt channel 152. Skin material melt channel 150 communicates with the first set of runners 104 of manifold 102 via a longitudinally extending slot 148 in sleeve 136 and side opening 148' of fixed sleeve 138. Slot 148 is sized and oriented with respect to the first set of runners 104 to permit melt flow to continue to skin material melt channel 150 when sleeve 136 is longitudinally repositioned. Core material melt channel 152 communicates with the second set of runners 106 of manifold 102 at outlet 158 to deliver the melt stream of the core material within nozzle tip 154, wherein the melt stream of core material is directed to flow within or between the melt flow of the skin material as described in more detail below. As such, sleeve 136 acts as a flow separator to keep the melt streams of the skin and core materials separated as they flow from manifold 102 into the various melt passages of nozzle tip 154.

With reference to FIG. 2, nozzle tip 154 of nozzle 120 includes a tip base 162, a tip divider 164 and a tip cap 166 that are retained by a threaded tip retainer 168 within a downstream end of nozzle body 121 with downstream surfaces of tip cap 166 and tip retainer 168 being spaced from gate insert 122 by a bubble area 169 that surrounds gate 124. Other coupling schemes, such as brazing, may also be used. Tip retainer 168 also includes a sealing portion 167 that fits or seals against gate insert 122 and prevents molding material from entering an insulating air space 171 therebetween.

Tip base 162 has an inner surface 160 that opposes outer surface 156 of sleeve 136 to define the upstream portion of core material melt passage 172a and tip divider and tip cap 164, 166 define a downstream portion of core material melt passage 172b therebetween. The upstream and downstream portions of core material melt passage 172a, 172b, which may be collectively referred to herein as core material melt passage 172 of nozzle tip 154, receive and direct a melt stream of core material from core material melt channel 152 through a central opening 182 of tip cap 166 to gate 124. Tip divider 164 also defines a central skin material melt passage 174 that receives the melt stream from sleeve skin material melt channel 150 and directs the melt stream of skin material to exit radially extending tunnel channels 178 to form an outer layer flow of skin material and to exit a central opening 176 of tip divider 164 to form an inner layer flow of the skin material. The inner layer flow of the skin material also passes through central opening 182 of tip cap 166 as it flows toward mold gate 124.

Each tunnel channel 178 has an inlet in fluid communication with central skin material melt passage 174 and an outlet in fluid communication with an outer layer melt passage 180, which is formed between an outer surface of tip cap 166 and an inner surface of tip retainer 168. Each tunnel channel 178 includes a downstream portion that is defined by a separate tunnel channel extension 199, which is a short tubular component. Each tunnel channel extension 199 has an upstream end secured within a corresponding counter bore of tip divider 164 and a length that bridges the downstream portion of the core material melt passage 172b to pass through a bore within tip cap 166. When so positioned, the outlet of each tunnel channel extension 199 is in fluid communication with outer layer melt passage 180 through which a portion of the melt stream of skin material received by each tunnel channel 178 is directed to gate 124. Each tunnel channel 178 may be considered laterally or radially extending in that it allows the molding material to flow sideways or outward relative to the general flow of molding material in central skin material melt passage 174. As well, tunnel channel extensions 199 and/or tunnel channels 178 defined thereby may be described to cross, or as crossing, the core material melt passage 172 and/or the core material melt stream that flows there through.

In FIG. 2, tip portion 128 of valve pin 126 is seated within gate 124 and a tip guiding segment 131 of valve pin 126 is seated within central openings 176, 182 of tip divider 164 and tip cap 166 such that neither the skin or core material is able to flow into mold cavity 133 from the core material melt passage 172, central skin material melt passage 174, or outer layer melt passage 180. Selective retraction of valve pin 126 from mold gate 124 and subsequently through central openings 176, 182 permits the simultaneous flow of the inner and outer layers of skin material from the skin material melt passage 174 and the outer layer melt passage 180, respectively, as well as the flow of the core layer melt flow from the core material melt passage 172 with the three melt flows combining in bubble area 169 proximate the gate area of the coinjection apparatus to thereafter simultaneously enter mold cavity 133 via gate 124. More particularly during an injection cycle, tip portion 128 of valve pin 126 may be retracted to a first retracted position unseated from gate 124 while nozzle tip guiding segment 131 of valve pin 126 remains seated within or blocking central openings 176, 182 of tip divider 164 and tip cap 166 such that only an outer layer melt flow of the skin material is permitted to flow into the melt cavity via gate 124, wherein the outer layer melt flow travels from central skin material melt passage 174 to mold gate 124 via tunnel channels 178, outer layer melt passage 180 and bubble area 169. A next step in the injection cycle includes actuating tip portion 128 of valve pin 126 to a retracted position unseated from gate 124 with tip guiding segment 131 of valve pin 126 unseated or withdrawn from blocking both tip diverter central opening 176 and tip cap central opening 182. Such a retracted position of valve pin 126 is shown in each of FIGS. 2A and 2B. When valve pin tip portion 128 is retracted in this manner, an inner layer melt flow of the skin material and a core material melt flow are permitted to flow into mold cavity 133 via mold gate 124 simultaneously with the outer layer melt flow of the skin material. The inner layer melt flow flows from central skin material melt passage 174 through tip diverter central opening 176 to thereafter meet with the core material melt flow that is flowing from nozzle tip core material melt passage 172, such that the inner layer melt flow and the core layer melt flow exit through central opening 182 of tip cap 166 with the inner layer melt flow located centrally within or essentially encircled by the core layer melt flow. After exiting tip cap central opening 182 in such a manner, the inner layer melt flow and the core layer melt flow meet with the outer layer melt flow of the skin material that is simultaneously flowing through bubble area 169 to gate 124 to thereby form a combined melt stream. The substantially concentric inner layer melt flow and core layer melt flow are thereby substantially surrounded by the outer layer melt flow as the three melt flows combine in bubble area 169 proximate the gate area of coinjection apparatus 100 and then simultaneously enter the mold cavity via gate 124. In this manner the components of nozzle tip 154 are able to position the core layer melt flow between the outer and inner layer melt flows of the skin material as the three melt flows simultaneously flow through bubble area 169 and enter gate 124. As such, coinjection apparatus 100 is capable of forming a molded article that includes an inner and outer layer of a first or skin material with a middle layer of a second or core material through simultaneous injection of the skin and core materials, which permits faster cycle times and also facilitates thin-walled molding application. In this manner, coinjection apparatus 100 permits the formation of a three layer molded article such as molded caps 435, 435' shown in FIG. 4.

As mentioned above, a longitudinal position of sleeve 136 may be changed by an operator of coinjection apparatus 100 to raise or lower downstream end 143 of sleeve 136 that is disposed within nozzle tip 154, as best understood by comparing a position of downstream end 143 in FIG. 2 with a position of downstream end 143 in FIGS. 2A and 2B, respectively. Annular opening 119 is defined between a slanted downstream surface 163 of repositionable sleeve downstream end 143 and a corresponding slanted surface 165 of tip cap 166. In another embodiment, opposing surfaces 163, 165 may be flat contacting surfaces. Upstream repositioning of downstream end 143 will increase a size or width of annular opening 119, as shown in FIG. 2A, and thereby permit a greater volume of core material to flow through the downstream portion of core material melt passage 172b during an injection cycle. When coinjection apparatus 100 is in this configuration, a thick core layer 134 is produced as shown in molded cap 435 of FIG. 4A, which may be beneficial in an application where the core material is a filler material, for instance, of a recycled material, that is of lesser cost than a virgin skin material that is used in forming the inner and outer layers of the molded cap. Similarly downstream repositioning of downstream end 143 will decrease a size or width of annular opening 119, as shown in FIG. 2B, and thereby reduce a volume of core material flowing through the downstream portion of core material melt passage 172b during an injection cycle. When coinjection apparatus 100 is in this configuration, a relatively thinner core layer 134' is produced as shown in molded cap 435' of FIG. 4B, which may be beneficial in a molding application where the core material is an expensive material that is being used as a barrier layer such as a barrier layer of ethylene vinyl alcohol (EVOH) polymers. In this manner, coinjection apparatus 100 permits adjustment of a core layer material flow proximate a downstream end of the hot runner system, and more specifically permits adjustment of the core layer material flow within nozzle tip 154, to allow for more precise control of a volume of core layer material being provided to mold cavity 133.

Accordingly in accordance with embodiments hereof, valve pin 126 of coinjection apparatus 100 is actuated to have a double stroke and to thereby create in conjunction with nozzle tip 154 a three melt flow pattern at gate 124 by dividing one of two incoming melt streams into two separate melt flows. In a method in accordance with an embodiment hereof, a first stroke of valve pin 126 unseats valve pin tip portion 128 from gate 124 to allow a skin material, such as polypropylene (PP), to create a first layer flow of PP at gate 124 while valve pin tip guiding segment 131 is blocking the flow of a core material layer such as for example, a barrier material, such as ethylene vinyl alcohol polymer (EVOH), from flowing through nozzle tip core material melt passage 172. A second stroke of valve pin 126 retracts valve pin tip portion 128 to upstream of nozzle tip core material melt passage 172 to create a barrier layer flow of EVOH and also upstream of central opening 176 of tip divider 164 to create an inner layer flow of PP. In the manner as described above, the second layer of EVOH exits core material melt passage 172 so as to be positioned between the outer and inner layers of PP within gate 124.

In accordance with an embodiment hereof a stroke distance of valve pin 126 may be adjusted in order to control a radial position of a core layer of a barrier material relative to the inner and outer layers of a skin material in a molded article. Valve pin 126 may be positioned such that tip portion 128 projects within central opening 176 of tip divider 164 causing a slight throttling or restriction of the inner layer melt flow of the skin material through central opening 176. Such a restriction of the flow of the inner layer of skin material through central opening 176 results in an increase in the volume of skin material being directed as the outer layer melt flow through outer layer melt passage 180 and bubble area 169. By increasing a volume of the skin material directed through outer layer melt passage 180 and bubble area 169 to gate 124 relative to a volume of the skin material directed through central opening 176 to gate 124, the core layer of core material melt flow will be moved radially inward by the greater volume of the outer layer melt flow and the reduced volume of the inner layer melt flow. As such, in the resulting molded article, a core layer of the barrier material will be radially positioned between inner and outer layers of the skin material closer to an inner surface of the molded article.

Conversely, when valve pin 126 is positioned at a greater upstream retracted position than shown in FIGS. 2A and 2B, for instance with valve pin tip portion 128 retracted to be level with or upstream of tunnel channels 178, central opening 176 of tip divider 164 is wide open to allow the inner layer melt flow of the skin material to freely flow through central opening 176, which results in an increase in the skin material being directed as the inner layer melt flow as compared to the skin material being directed as the outer layer melt flow through outer layer melt passage 180 and bubble area 169. By increasing a volume of the skin material directed through central opening 176 to gate 124 relative to a volume of the skin material directed through outer layer melt passage 180 and bubble area 169 to gate 124, the core material melt flow of the core material will be moved radially outward in the combined melt stream by the greater volume of the inner layer melt flow and the reduced volume of the outer layer melt flow. As such in the resulting molded article, a core layer of the core material will be radially positioned between inner and outer layers of the skin material closer to an outer surface of the molded article.

During operation, an operator or automated inspection device may inspect a newly molded article for core layer position relative to inner and outer layers of skin material. If the core layer of the molded article is found to be positioned in an unsatisfactory or undesirable manner, the operator may then instruct a controller of actuators 115 to adjust a retracted position of valve pin 126 to change the barrier layer position relative to the inner and outer layers of the skin material in a manner as described in the preceding paragraph.

Figure 5:
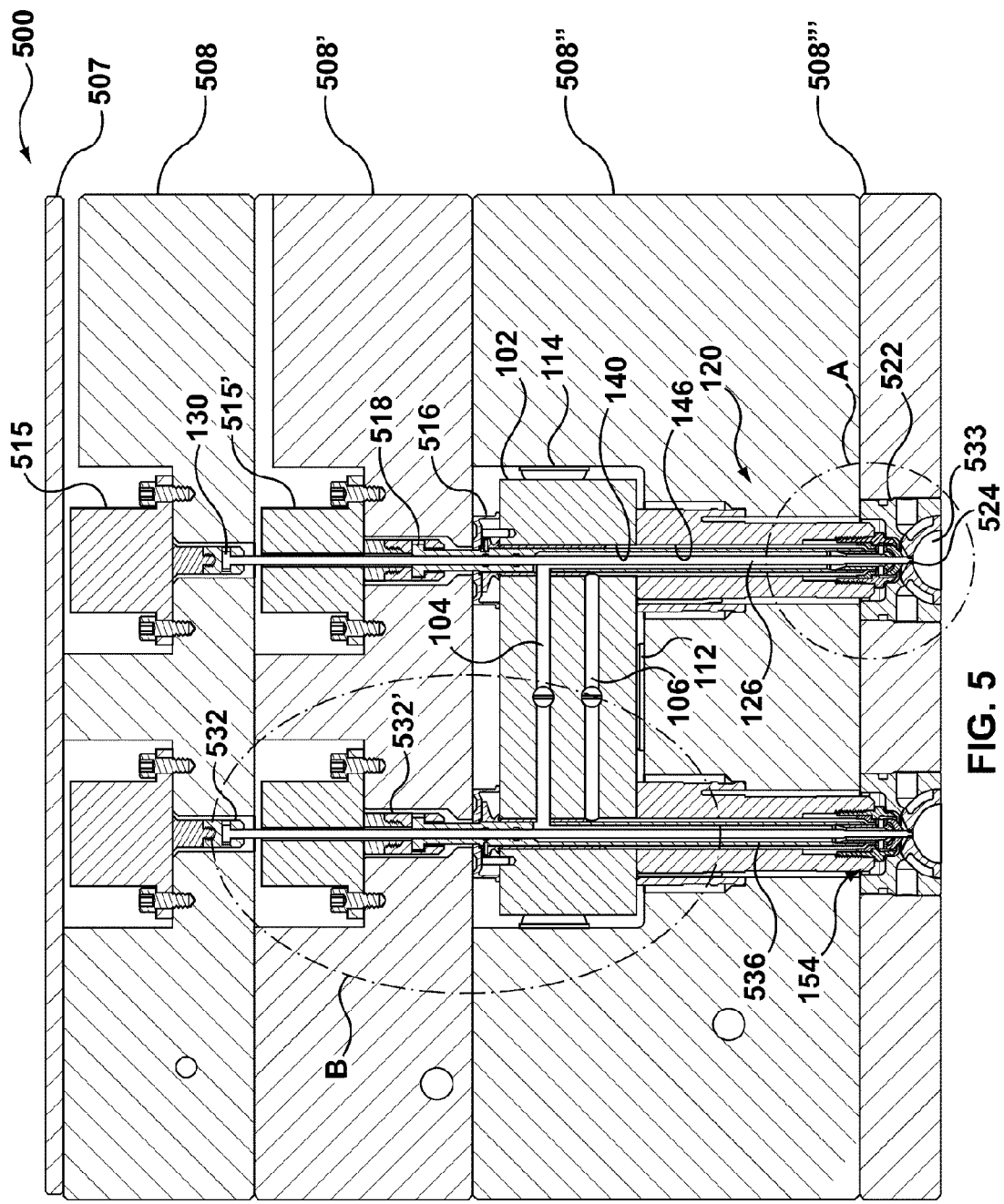
FIG. 5 is a sectional view of a coinjection hot runner injection molding system in accordance with another embodiment hereof.

FIG. 5 depicts a sectional view of a hot runner coinjection apparatus 500 in accordance with another embodiment hereof. Features and aspects of the prior embodiment described herein may be used accordingly with the current embodiment and the same reference numbers are used for features of coinjection apparatus 500 that remain unchanged from coinjection apparatus 100 described above, as such those features are not further described in detail herein. In FIG. 5, coinjection apparatus 500 includes a mold cavity 533 for producing a three-layer preform, such as molded preform 835 shown in section in FIG. 8.

With reference to FIG. 5, coinjection apparatus 500 includes a backing plate 507 and various cooled mold plates 508, 508', 508", 508''' in which components of the coinjection apparatus are situated as would be understood by one of ordinary skill in the art. Manifold 102 is located within cooled mold plate 508" surrounded by an insulative air gap that is maintained by locating ring 112, pressure disks 114, and valve disks 516. Coinjection apparatus 500 further includes hot runner valve-gated nozzles 120 having nozzle tips 154 that correspond to a respective mold gate 524 defined by a respective mold gate insert 522, which is disposed within mold plate 508'''. Although a gate area and mold gate 524 of coinjection apparatus 500 is formed by mold gate insert 522, this is by way of illustration rather than limitation as one of skill in the art would recognize that the gate area may defined instead by one or more other injection molding structure(s), such as a mold gate and gate area defined in a mold cavity plate, without departing from the scope of the present invention.

Manifold 102 and each valve-gated nozzle 120 are adapted to receive an actuatable sleeve 536 through respective bores 140, 146 with valve pin 126 slidably extending within sleeve 536. Disposed in mold plate 508 are valve pin actuators 515, each for actuating a respective valve pin 126 of the respective nozzle 120. Valve pin head portions 130 are coupled to valve pin actuators 515 by a respective valve pin coupler 532. Disposed in mold plate 508' are sleeve actuators 515' for actuating sleeves 536. Head portions 518 of actuatable sleeves 536 are fixed or coupled to sleeve actuator 515' by a respective sleeve coupler 532'. In various embodiments in accordance herewith, valve pin actuators 515 and sleeve actuators 515' translate respective valve pins 126 and sleeves 536 between open, closed and various intermediate positions by linear motion, e.g., a pneumatic or hydraulic piston, or rotary motion, e.g., an electric screw drive. In embodiments hereof, valve pin actuators 515 and sleeve actuators 515' may be electronic servomotor drives, such as an E-Drive™ System available from Mold-Masters Limited of Georgetown, Ontario Canada, which permit valve pins 126 and actuatable sleeves 536 to be actuated between open, closed and various intermediate positions therebetween. In another embodiment, a solenoid actuator that provides incremental movement of the valve pin and sleeve may be used.

In various other embodiments, any valve pin actuation system that allows the valve pin and sleeve to be moved incrementally may be used.

Figure 6:
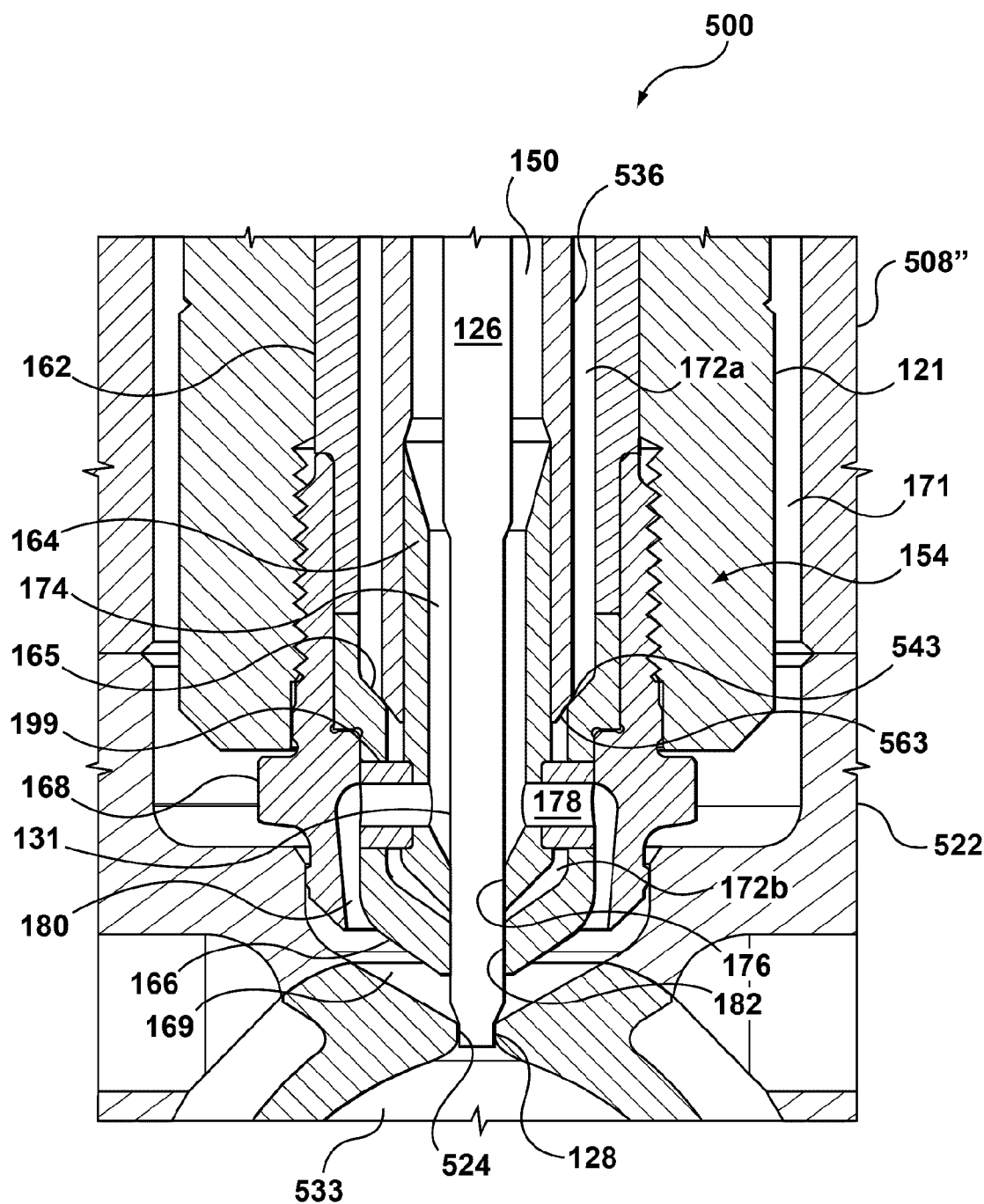
FIG. 6 is an enlarged view of Area A of FIG. 5 showing each of a valve pin and an actuatable sleeve in a closed position.
Figure 7:
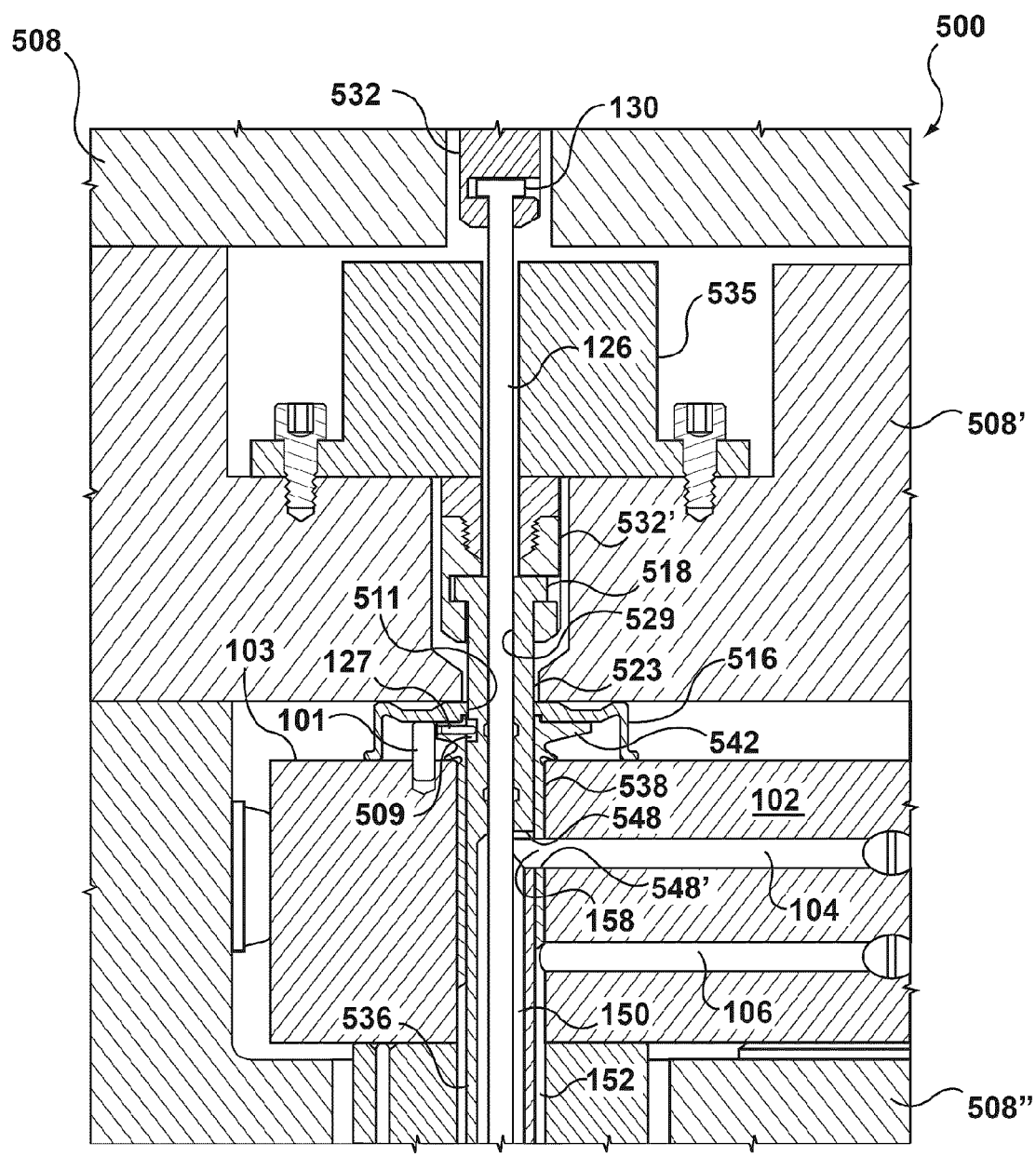
FIG. 7 is an enlarged view of Area B of FIG. 5.

With references to FIGS. 5, 6 and 7, actuatable sleeve 536 is an elongate hollow tubular structure having an upstream end 523 that defines a valve pin guiding bore 529 that is sized to be substantially equal to an outer diameter of valve pin 126 while still allowing for sliding movement of valve pin 126 therein and a downstream end 543 that is disposed within nozzle tip 154. Upstream end 523 of actuatable sleeve 536 is disposed within an outer fixed sleeve 538 and is sized to be substantially equal to an inner diameter of fixed sleeve 538 while still allowing for sliding movement therein. Fixed sleeve 538 includes a radially extending head segment 542 that sits or is sandwiched between pressure disk 516 and an upstream surface 103 of manifold 102. Rotation of fixed sleeve 538 relative to manifold 102 is prevented by engagement of an anti-rotation pin or dowel 101 between head segment 542 and manifold 102. In turn rotation of actuatable sleeve 536 relative to fixed sleeve 538 is prevented by engagement of an anti-rotation pin or dowel 127 between a longitudinally extended slot 509 in upstream end 523 of sleeve 536 and a corresponding bore within head segment 542 of fixed sleeve 538. In another embodiment, anti-rotation pin 127 may be disposed between sleeve head portion 518 and sleeve coupler 532'.

Upstream end 523 of actuatable sleeve 536 slidably extends through an aperture 511 of valve disk 516 and includes head portion 518 that engages with sleeve coupler 532', as noted above. The hollow tubular structure of sleeve 536 defines a central skin material melt channel 150 and forms an annular core material melt channel 152 between an outer surface thereof and bores 140, 146 of manifold 102 and nozzle 120, respectively, and an upstream portion of an annular core material melt passage 172a between the sleeve outer surface and a corresponding surface of nozzle tip 154. Accordingly, sleeve 536 effectively divides manifold bore 140 and nozzle bore 146 into two concentric melt channels, with skin material melt channel 150 being surrounded by annular core material melt channel 152. Skin material melt channel 150 communicates with the first set of runners 104 of manifold 102 via a longitudinally extending slot 548 in sleeve 536 and side opening 548' of fixed sleeve 538. Slot 548 is sized and oriented with respect to the first set of runners 104 to permit melt flow to continue to skin material melt channel 150 when sleeve 536 is actuated between a retracted upstream position, an extended downstream position and various intermediate positions therebetween. Core material melt channel 152 communicates with the second set of runners 106 of manifold 102 at outlet 158 to deliver the melt stream of the core material within nozzle tip 154, wherein the melt stream of core material is directed to flow within or between the melt flow of the skin material as described in detail above. As such, sleeve 536 acts as a flow separator to keep the melt streams of the skin and core materials separated as they flow from manifold 102 into the various melt passages of nozzle tip 154.

Figure 6A:
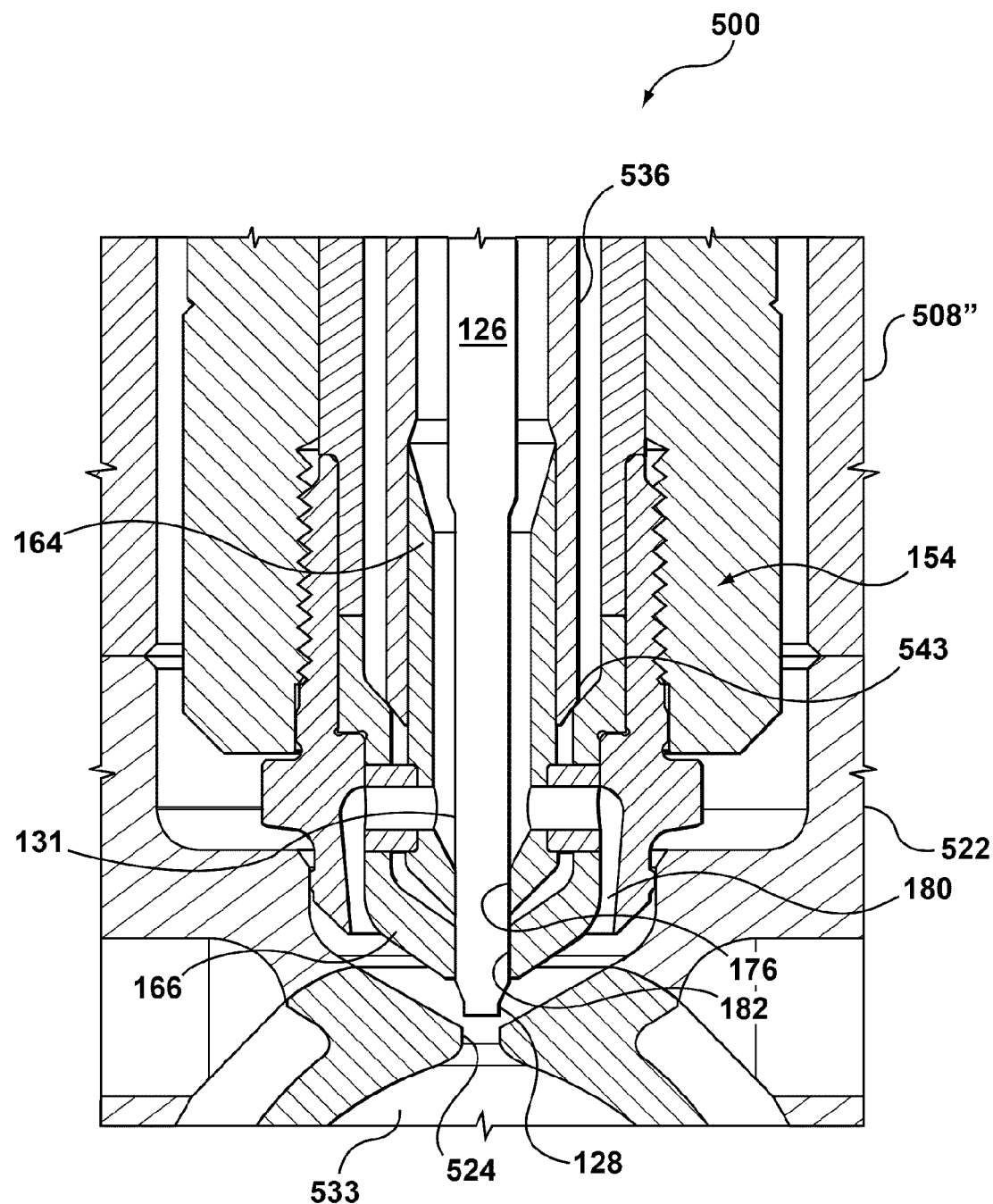
FIGS. 6A through 6E depict the gate area shown in FIG. 6 during various steps of an injection molding sequence that may be suitable for producing a molded preform as shown in FIG. 8.
Figure 6B:
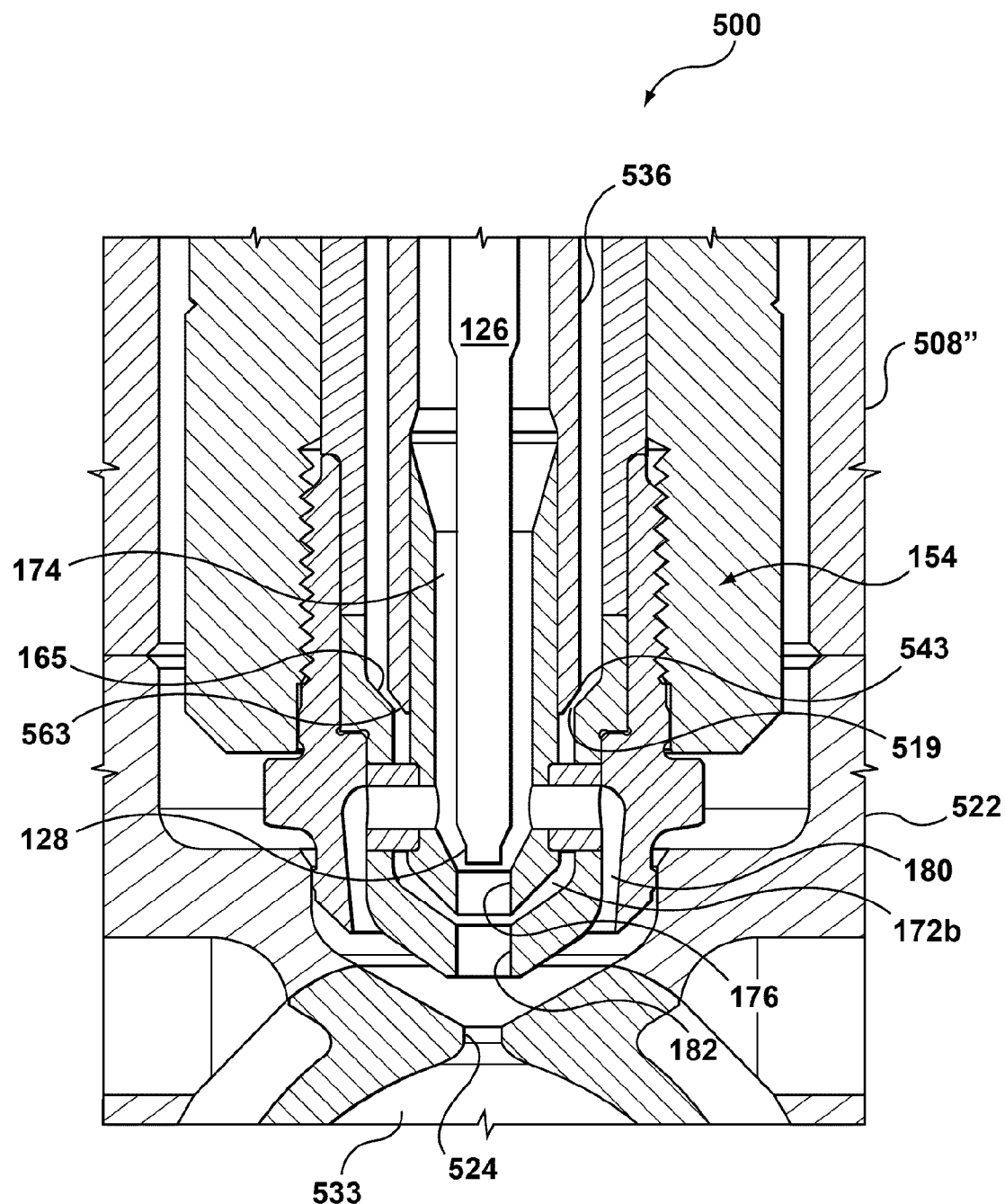
Figure 6C:
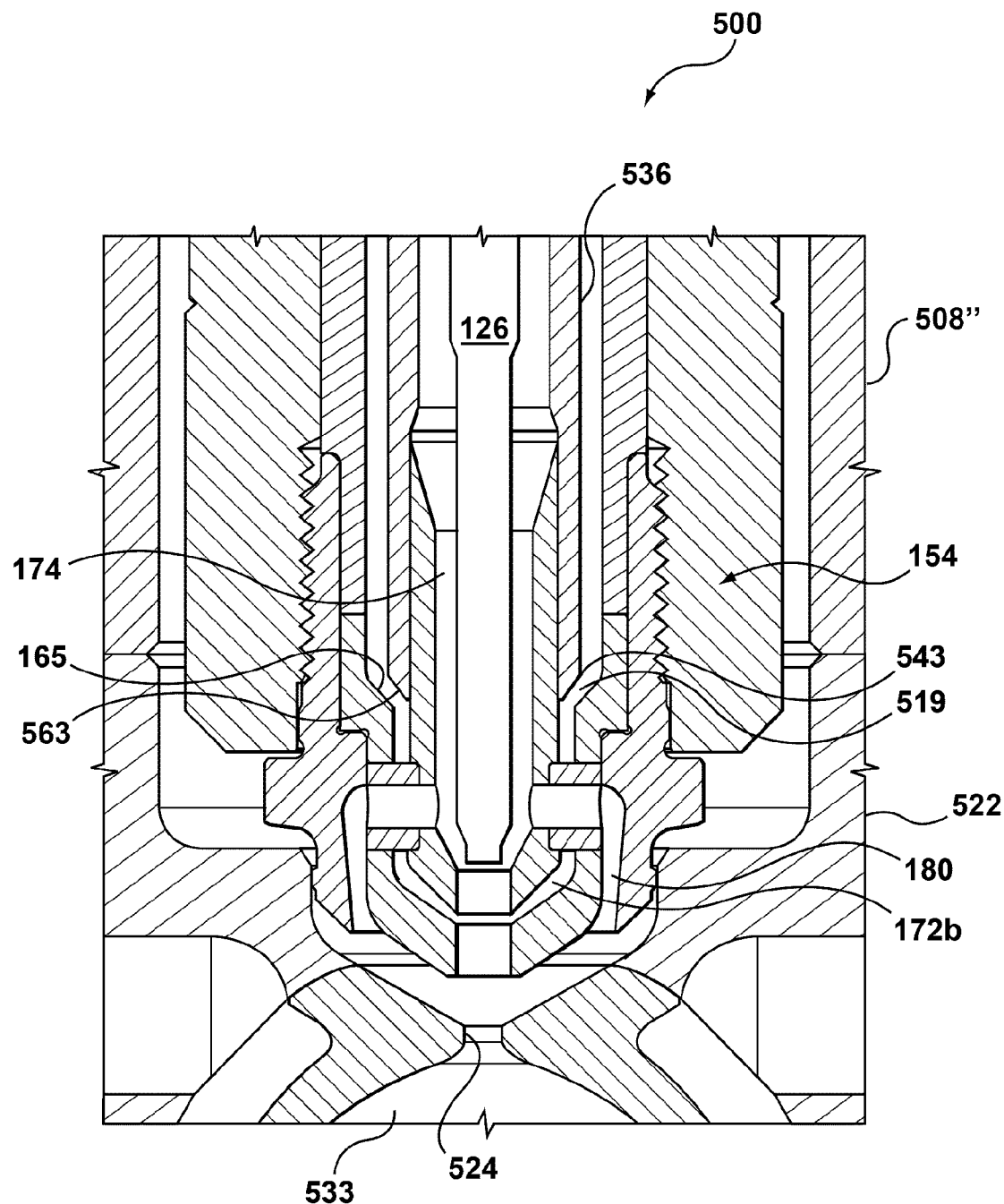
Figure 6D:
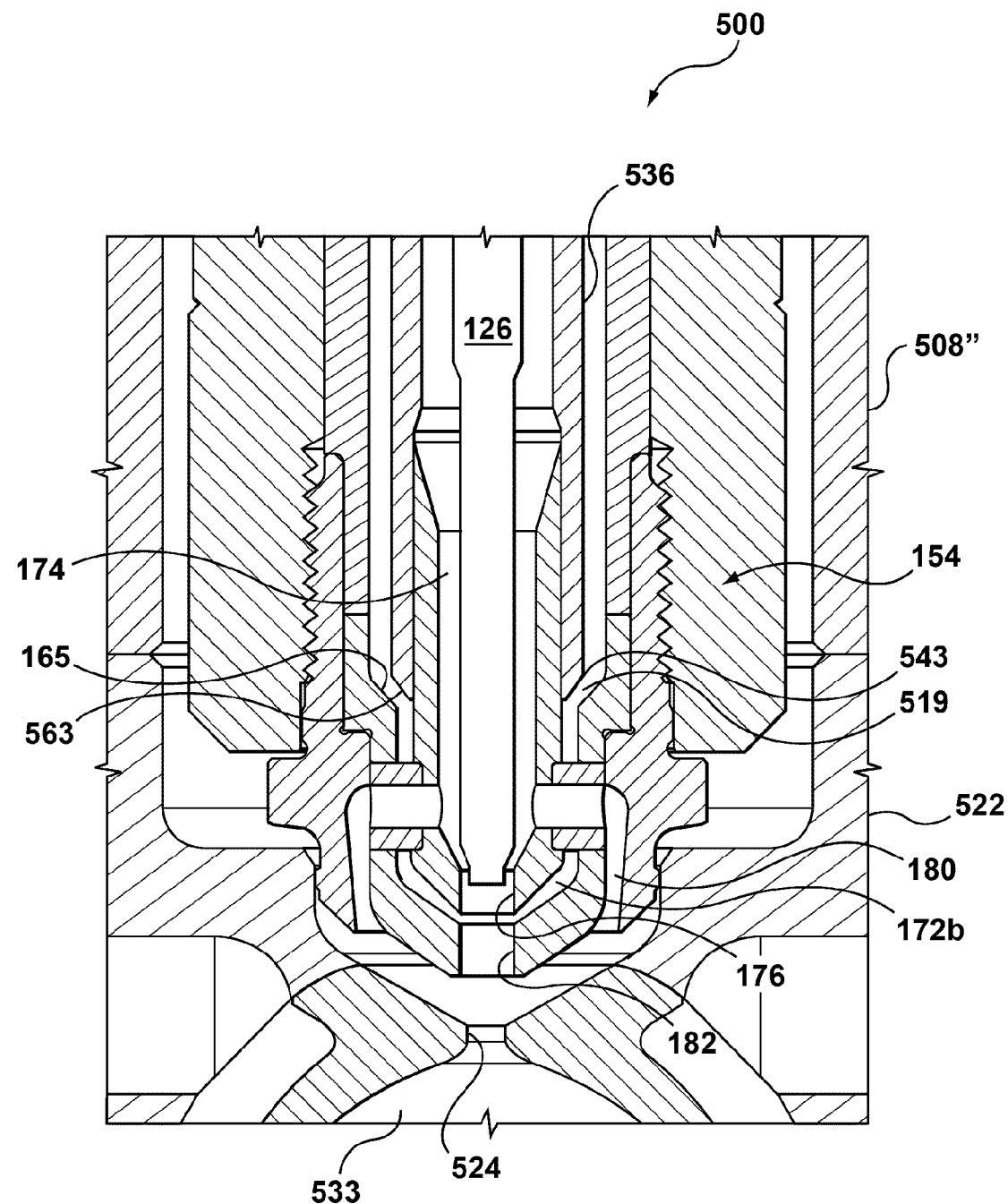
Figure 6E:
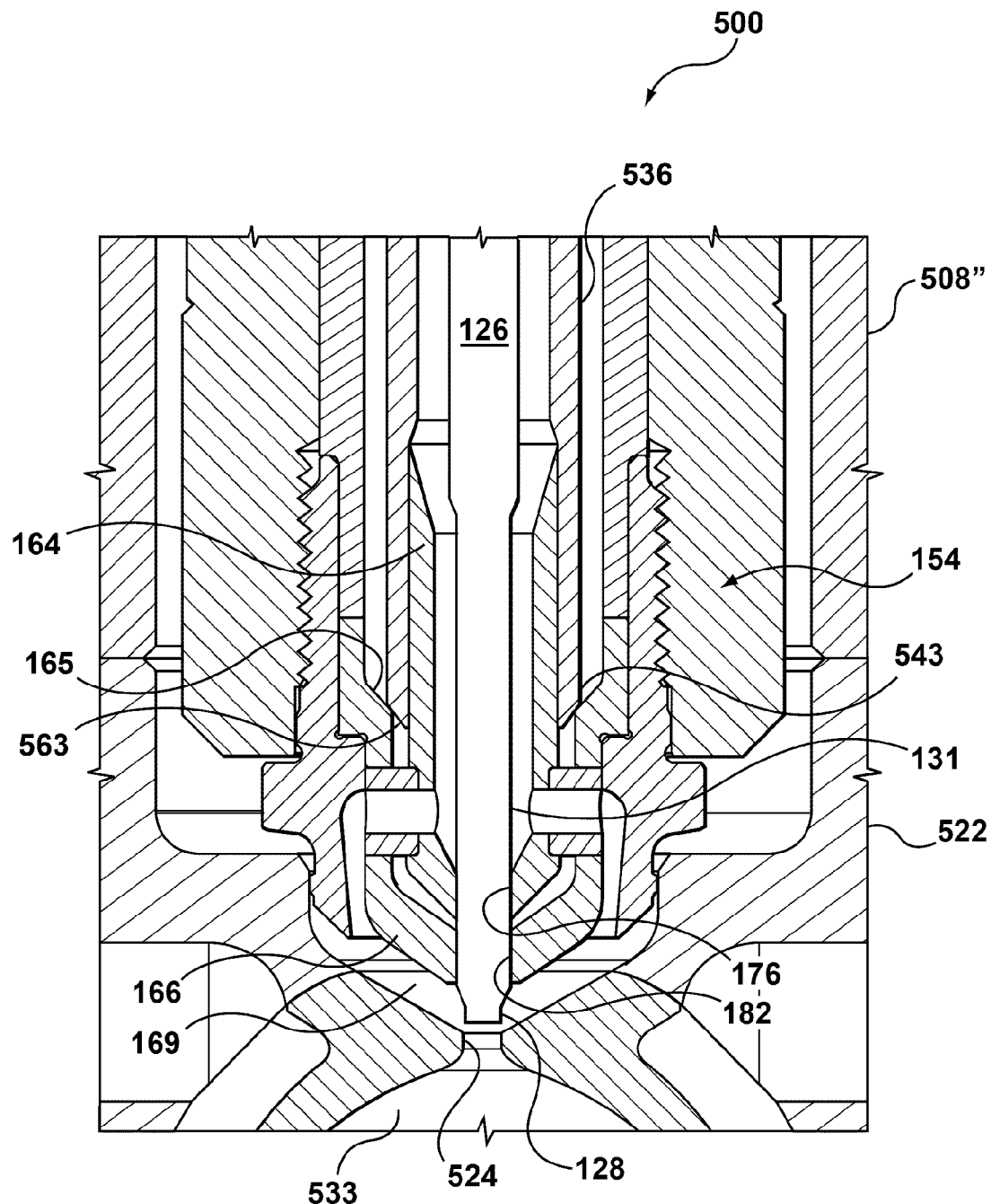
Figure 8:
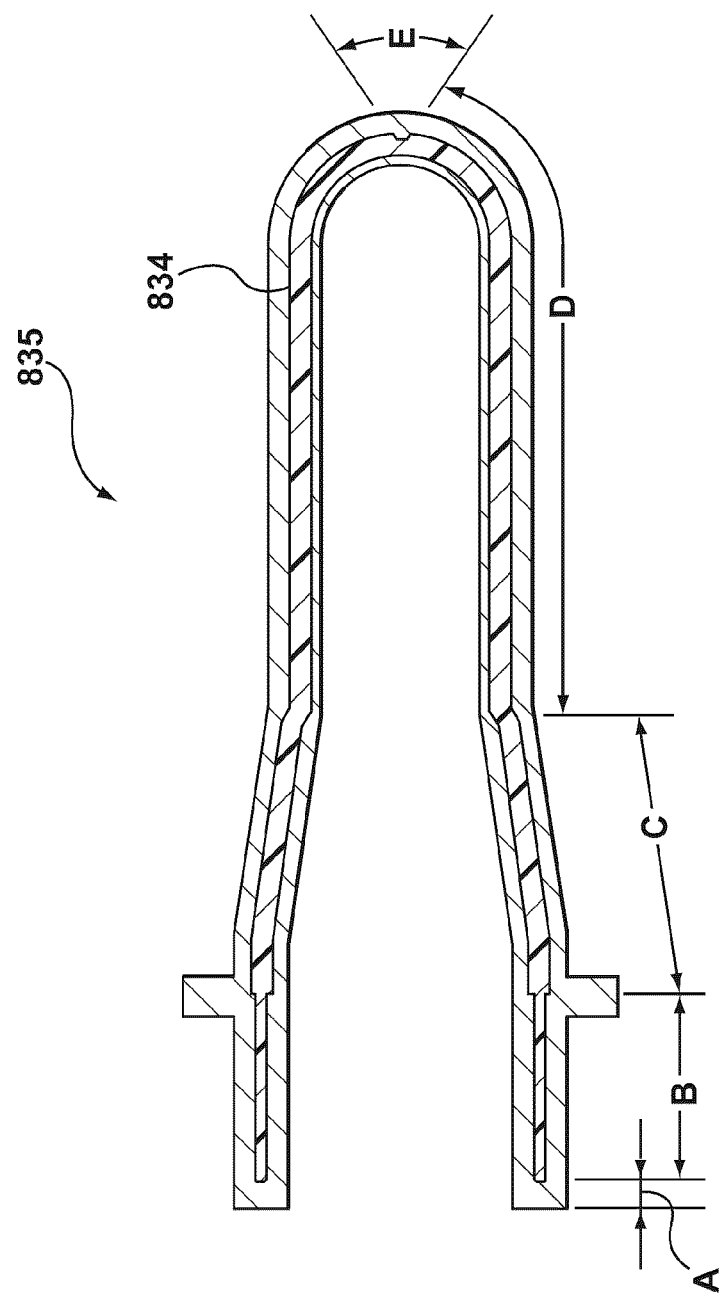
FIG. 8 is a sectional view of an exemplary molded preform that may be molded by the coinjection apparatus of FIG. 5.

With reference to FIGS. 6 and 6A-6E an injection molding sequence is depicted for producing molded preform 835 shown in FIG. 8. As mentioned above, sleeve 536 is actuatable between a fully open position as shown in FIGS. 6C and 6D, a closed position as shown in FIGS. 6, 6A and 6E as well as various intermediate partially open or throttling positions therebetween as represented by FIG. 6B. The actuation of sleeve 536 is automated during the injection cycle to produce a change in the thickness of a core layer of a molded article, such as core layer 834 of molded preform 835 shown in FIG. 8. Movement of downstream end 543 of sleeve 536 opens and closes annular opening or aperture 519. Similar to the previous embodiment, annular opening 519 is defined between a downstream surface 563 of sleeve downstream end 543 and corresponding surface 165 of tip cap 166, to provide melt communication between upstream portion of core material melt passage 172a and downstream portion of core material melt passage 172b. An inner diameter of a downstream segment of sleeve 536 is sized to slide over an outer surface of an upstream segment of tip divider 164 as sleeve 536 is moved between the open and closed positions. More particularly, actuation of sleeve 536 raises or lowers downstream end 543 of sleeve 536 that is disposed within nozzle tip 154 to fully open, partially open, and close annular opening 519 during the injection cycle. In this manner, coinjection apparatus 500 permits automated adjustment of a volume of a core layer material flow proximate a downstream end of the hot runner system, and more specifically permits adjustment of the core layer material flow from nozzle tip 154, to allow for more precise control of a volume of core layer material being provided to mold cavity 533 to thereby adjust the thickness of the core layer in the molded article throughout an injection cycle, as described in detail below.

An exemplary injection molding sequence for forming molded preform 835 is now described with reference to FIGS. 6 and 6A-6E. It should be understood that most features and functions of nozzle tip 154 in coinjection apparatus 500 were previously described in detail with reference to coinjection apparatus 100 and only the operation of actuatable sleeve 536 and the method thereof will be fully described in this embodiment.

FIG. 6 depicts tip portion 128 of valve pin 126 seated within mold gate 524 and downstream end 543 of sleeve 536 abutting surface 165 of tip cap 166 such that each is in a closed position to prevent melt flow through nozzle tip 154. FIG. 6A depicts tip portion 128 of valve pin 126 unseated from mold gate 524 with tip guiding segment 131 blocking flow through central openings 176, 182 of respective tip divider 164 and tip cap 166 and with sleeve 536 still abutting surface 165 of tip cap 166. In such a configuration, sleeve 536 remains in the closed position and valve pin 126 is in a partially open position to allow skin material to flow from outer layer melt passage 180 into mold cavity 533 to thereby form section A of preform 835 as shown in FIG. 8.

FIG. 6B depicts tip portion 128 of valve pin 126 in an open position retracted from each of mold gate 524 and central openings 176, 182 with sleeve 536 retracted to a partially open or throttle position with a width of annular opening 519 sized to permit some core material flow therethrough. In such a configuration, skin material flows in substantially equal volumes from each of central skin material melt passage 174 and outer layer melt passage 180 to mold cavity 533 while a throttled or less than full volume of core material flows through annular opening 519 and subsequently through downstream portion of core material melt passage 172b to mold cavity 533. In this step, coinjection apparatus 500 forms section B of preform 835 having a thin core layer 834 positioned between equal thicknesses of inner and outer layers of skin material as shown in FIG. 8.

FIG. 6C depicts valve pin 126 in the open position depicted in FIG. 6B with sleeve 536 fully retracted to a fully open position with a width of annular opening 519 sized to permit a maximum volume of core material flow therethrough. In such a configuration, skin material continues to flow in substantially equal volumes from each of central skin material melt passage 174 and outer layer melt passage 180 to mold cavity 533 while a full volume of core material flows through annular opening 519 and subsequently through downstream portion of core material melt passage 172b to mold cavity 533. In this step, coinjection apparatus 500 forms section C of preform 835 having a thick core layer 834 positioned between equal thicknesses of inner and outer layers of skin material.

FIG. 6D depicts tip portion 128 of valve pin 126 in a partially open or throttled position partially disposed in tip divider central opening 176 while fully retracted from each of mold gate 524 and tip cap central opening 182. Sleeve 536 is shown in the fully open position depicted and described with reference to FIG. 6C. In such a configuration due to the throttling provided by valve pin 126, more skin material is directed to mold cavity 533 via outer layer melt passage 180 than central skin material melt passage 174 such that within mold cavity 533 a greater volume of skin material forms the outer layer of the molded article as compared with the inner layer of the molded article. In addition, a full volume of core material continues to flow through annular opening 519 and subsequently through downstream portion of core material melt passage 172b to mold cavity 533. In this step, coinjection apparatus 500 forms section D of preform 835 having a thick core layer 834 positioned closer to a core or interior side of preform 835 with a thinner inner layer and a thicker outer layer of skin material compared to the remainder of the preform.

FIG. 6E depicts tip portion 128 of valve pin 126 advanced downstream from its position in FIG. 6D with tip guiding segment 131 once again positioned to block flow through central openings 176, 182 of respective tip divider 164 and tip cap 166 and with tip portion 128 disposed within bubble area 169 unseated from mold gate 524. Downstream end 543 of sleeve 536 is also advanced downstream from its position in FIG. 6D such that surface 563 thereof abuts with surface 165 of tip cap 166 to close annular opening 519. In such a configuration, sleeve 536 is once again in the closed position and valve pin 126 is in a partially open position to allow skin material to flow from outer layer melt passage 180 into mold cavity 533 and thereby pack the final section E of preform 835 as shown in FIG. 8 to prevent core layer break through. Thereafter, as shown in FIG. 6, valve pin tip portion 128 is seated within mold gate 524 and sleeve 536 remains in a closed position to end the injection cycle.

In accordance with another embodiment hereof, a stroke distance of valve pin 126 may be adjusted in order to move or shift a radial position of a core layer of a barrier material outwardly relative to the inner and outer layers of a skin material in a molded article. In such an embodiment, valve pin 126 is positioned at a greater upstream retracted position than shown in FIGS. 6B and 6C, for instance with valve pin tip portion 128 retracted to be level with or upstream of tunnel channels 178, such that central opening 176 of tip divider 164 is wide open to allow the inner layer melt flow of the skin material to freely flow through central opening 176. As a result of valve pin 126 being so positioned, an increase in the volume of skin material being directed as the inner layer melt flow as compared to the volume of skin material being directed as the outer layer melt flow through outer layer melt passage 180 occurs. By increasing a volume of the skin material directed through central opening 176 to gate 124 relative to a volume of the skin material directed through outer layer melt passage 180 and bubble area 169 to gate 124, the core material melt flow of the core material will be moved radially outward in the combined melt stream by the greater volume of the inner layer melt flow and the reduced volume of the outer layer melt flow.

Although coinjection apparatus 100, 500 are shown with one-piece mold gate inserts 122, 522 that define respective mold gates 124, 524 other embodiments may have a multiple piece mold gate insert component, or may not have a mold gate insert but instead simply having a well in a mold plate. As well without departing from the scope of the present invention, mold gate inserts 122, 522 may or may not have a surface that provides a portion of the mold cavity and may or may not include cooling channels (not shown) for circulating cooling fluid to assist in solidifying the molding material in the mold cavity.

Any of the movable sleeve embodiments described above may be adapted to be used in gas-assist injection molding applications. In such embodiments, a core material would be a gas, such as nitrogen, instead of a polymeric material. The gas would be supplied as a middle layer material to the molded article being produced.

In addition, although each of the embodiments described above is discussed as performing simultaneous injection of the first and second moldable materials within a mold cavity, systems in accordance with embodiments hereof may be actuated to perform sequential injection of the first and second moldable materials as may be preferable in certain molding applications, such as in the molding of thicker parts.

Materials for the components of the coinjection apparatus described herein include steel, tool steel (H13), copper alloy, copper-beryllium, titanium, titanium alloy, ceramic, high-temperature polymer, and similar materials. In an embodiment, the nozzle tip base may be made of TZM or molybdenum and the nozzle tip divider and cap parts as well as the tip retainer may each be made of H13. In embodiments hereof, sleeves 136, 536 may be made from H13 or any other material that can withstand injection pressures.

While various embodiments according to the present invention have been described above, it should be understood that they have been presented by way of illustration and example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other embodiment. All patents and publications discussed herein are incorporated by reference herein in their entirety.

What is claimed is:
1. A method of coinjection, the method comprising:
flowing a first melt stream of a first molding material within a hot runner valve-gated nozzle;
flowing a second melt stream of a second molding material within the nozzle;
dividing the first melt stream with a nozzle tip of the nozzle into an inner layer melt stream and an outer layer melt stream;
creating a combined melt stream with the second melt stream disposed between the inner layer melt stream and the outer layer melt stream, whereby the second melt stream becomes a core layer melt stream;
varying a volume of the inner layer melt stream to a volume of the outer layer melt stream within the combined melt stream to control a radial position of a core layer formed within a molded article produced by the combined melt stream; and adjusting a volume of the second material melt stream within the nozzle tip by increasing or decreasing a width of an annular opening between a downstream end of a sleeve component and a corresponding surface of the nozzle tip to control a volume of the core layer melt stream within the combined melt stream whereby a thickness is adjusted of the core layer formed within the molded article produced by the combined melt stream.

2. The method of claim 1, wherein the nozzle tip includes a central melt passage with a central opening for directing the inner layer melt stream toward a mold cavity and radial melt passages for directing the outer layer melt stream toward the mold cavity.

3. The method of claim 2, wherein the step of varying a volume of the inner layer melt stream to a volume of the outer layer melt stream includes positioning a tip portion of a valve pin of the nozzle within the central opening of the nozzle tip to throttle or reduce the volume of the inner layer melt stream directed therethrough.

4. The method of claim 3, wherein positioning the valve pin within the nozzle tip central opening concurrently increases the volume of the outer layer melt stream directed through the radial melt passages such that within the combined melt stream the greater volume of the outer layer melt stream as compared with the inner layer melt stream shifts the radial position of the core layer toward an inner surface of the molded article.

5. The method of claim 1, wherein increasing or decreasing the width of the annular opening includes adjusting a longitudinal position of the downstream end of the sleeve component relative to the corresponding surface of the nozzle tip between injection cycles.

6. The method of claim 5, wherein an upstream head portion of the sleeve component is threadably engaged through a corresponding bore of a valve disk and secured in a longitudinal position relative thereto by a lock nut and wherein adjusting the longitudinal position of the downstream end of the sleeve component includes loosening the lock nut to permit the valve disk to be rotated relative to the sleeve component.

7. The method of claim 1, wherein increasing or decreasing the width of the annular opening includes automatically adjusting a longitudinal position of the downstream end of the sleeve component relative to the corresponding surface of the nozzle tip during an injection cycle.

8. The method of claim 7, wherein an upstream head portion of the sleeve component is coupled to an actuator.

9. A method of coinjection, the method comprising:
flowing a first melt stream of a first molding material within a hot runner valve-gated nozzle;
flowing a second melt stream of a second molding material within the nozzle;
dividing the first melt stream with a nozzle tip of the nozzle into an inner layer melt stream and an outer layer melt stream;
creating a combined melt stream with the second melt stream disposed between the inner layer melt stream and the outer layer melt stream, whereby the second melt stream becomes a core layer melt stream; and
adjusting a volume of the second material melt stream within the nozzle tip by increasing or decreasing a width of an annular opening between a downstream end of a sleeve component and a corresponding surface of the nozzle tip to control a volume of the core layer melt stream within the combined melt stream whereby a thickness is adjusted of a core layer formed within a molded article produced by the combined melt stream.

10. The method of claim 9, wherein increasing or decreasing the width of the annular opening includes adjusting a longitudinal position of the downstream end of the sleeve component relative to the corresponding surface of the nozzle tip between injection cycles.

11. The method of claim 10, wherein an upstream head portion of the sleeve component is threadably engaged through a corresponding bore of a valve disk and secured in a longitudinal position relative thereto by a lock nut and wherein adjusting the longitudinal position of the downstream end of the sleeve component includes loosening the lock nut to permit the valve disk to be rotated relative to the sleeve component.

12. The method of claim 9, wherein increasing or decreasing the width of the annular opening includes automatically adjusting a longitudinal position of the downstream end of the sleeve component relative to the corresponding surface of the nozzle tip during an injection cycle.

13. The method of claim 12, wherein an upstream head portion of the sleeve component is coupled to an actuator.

14. A method of coinjection, the method comprising:
flowing a first melt stream of a first molding material within a valve-gated nozzle;
flowing a second melt stream of a second molding material within the nozzle;
dividing the first melt stream with a nozzle tip of the nozzle into an inner layer melt stream and an outer layer melt stream, wherein the nozzle tip includes a central melt passage with a central opening for directing the inner layer melt stream toward a mold cavity and radial melt passages for directing the outer layer melt stream toward the mold cavity;
creating a combined melt stream with the second melt stream disposed between the inner layer melt stream and the outer layer melt stream, whereby the second melt stream becomes a core layer melt stream;
varying a volume of the inner layer melt stream to a volume of the outer layer melt stream within the combined melt stream by positioning a tip portion of a valve pin of the nozzle within the central opening of the nozzle tip to throttle or reduce the volume of the inner layer melt stream directed therethrough to thereby control a radial position of a core layer formed within a molded article produced by the combined melt stream; and
adjusting a volume of the second material melt stream within the nozzle tip by increasing or decreasing a width of an annular opening between a downstream end of a sleeve component and a corresponding surface of the nozzle tip to control a volume of the core layer melt stream within the combined melt stream whereby a thickness is adjusted of the core layer formed within the molded article produced by the combined melt stream.

15. The method of claim 14, wherein positioning the valve pin within the nozzle tip central opening concurrently increases the volume of the outer layer melt stream directed through the radial melt passages such that within the combined melt stream the greater volume of the outer layer melt stream as compared with the inner layer melt stream shifts the radial position of the core layer toward an inner surface of the molded article.

16. The method of claim 14, wherein increasing or decreasing the width of the annular opening includes adjusting a longitudinal position of the downstream end of the sleeve component relative to the corresponding surface of the nozzle tip between injection cycles.

17. The method of claim 16, wherein an upstream head portion of the sleeve component is threadably engaged through a corresponding bore of a valve disk and secured in a longitudinal position relative thereto by a lock nut and wherein adjusting the longitudinal position of the downstream end of the sleeve component includes loosening the lock nut to permit the valve disk to be rotated relative to the sleeve component.

18. The method of claim 17, wherein an upstream head portion of the sleeve component is coupled to an actuator.

* * * * *